United States Patent [19]

Newton

[11] Patent Number: 4,657,670
[45] Date of Patent: Apr. 14, 1987

[54] AUTOMATIC DEMAND CHLORINATION SYSTEM

[75] Inventor: Ronald R. Newton, Stateline, Nev.

[73] Assignee: Sierra Design and Development, Inc., Reno, Nev.

[21] Appl. No.: 754,021

[22] Filed: Jul. 11, 1985

[51] Int. Cl.⁴ .......................... C02f 1/76; G05D 11/08
[52] U.S. Cl. ..................................... 210/85; 210/96.1; 210/139; 210/143; 210/169; 137/93; 307/591; 324/441
[58] Field of Search ................. 210/85, 96.1, 138, 139, 210/143, 149, 169, 194, 205, 206, 746, 754–756; 137/5, 93; 324/441, 446; 307/362, 591; 422/26, 62

[56] References Cited

U.S. PATENT DOCUMENTS

| | | | |
|---|---|---|---|
| 1,518,211 | 2/1923 | Maue | 324/30 B |
| 3,051,631 | 8/1962 | Harbin, Jr. et al. | 204/1 |
| 3,170,111 | 2/1965 | Case | 324/30 |
| 3,195,551 | 7/1965 | Russell | 137/5 |
| 3,376,883 | 4/1968 | Douty et al. | 137/88 |
| 3,441,490 | 4/1969 | Johansson | 324/30 X |
| 3,466,927 | 9/1969 | Magrini | 73/194 |
| 3,528,545 | 9/1970 | Frazel et al. | 210/96.1 |
| 3,554,212 | 1/1971 | Maroney et al. | 137/93 |
| 3,648,080 | 3/1972 | Nakaya | 307/293 |
| 3,660,681 | 5/1972 | Vlaeminck | 307/293 X |
| 3,682,131 | 8/1972 | Algeri et al. | 307/293 X |
| 3,697,879 | 10/1972 | Holliday | 307/293 X |
| 4,016,079 | 4/1977 | Severin | 210/139 X |
| 4,033,871 | 7/1977 | Wall | 210/169 X |
| 4,224,154 | 9/1980 | Steininger | 210/85 |
| 4,323,092 | 4/1982 | Zabel | 210/96.1 X |
| 4,550,011 | 10/1985 | McCollum | 210/169 X |

FOREIGN PATENT DOCUMENTS 1361292  7/1974  United Kingdom .

Primary Examiner—Tom Wyse
Attorney, Agent, or Firm—Limbach, Limbach & Sutton

[57] ABSTRACT

An automatic demand chlorination system for use with a recirculation unit for a body of fluid, the body of fluid has a chemical therein. The automatic demand chlorination system comprises a chemical sensing unit for detecting the amount of the chemical and producing a signal, a chemical feed unit for feeding the chemical into the recirculation unit, an electronics unit for controlling the feeding of the chemical, and a solenoid unit for actuating the chemical feed unit. The electronics unit comprises input signal regulation means for receiving the signal of the sensing unit and generating a regulated signal; comparator means for comparing the regulated signal with a predetermined signal representative of the desired amount of the chemical in the recirculation unit and generating a chemical infeed signal; and solenoid timer means for receiving the chemical infeed signal and activating the solenoid unit.

31 Claims, 6 Drawing Figures

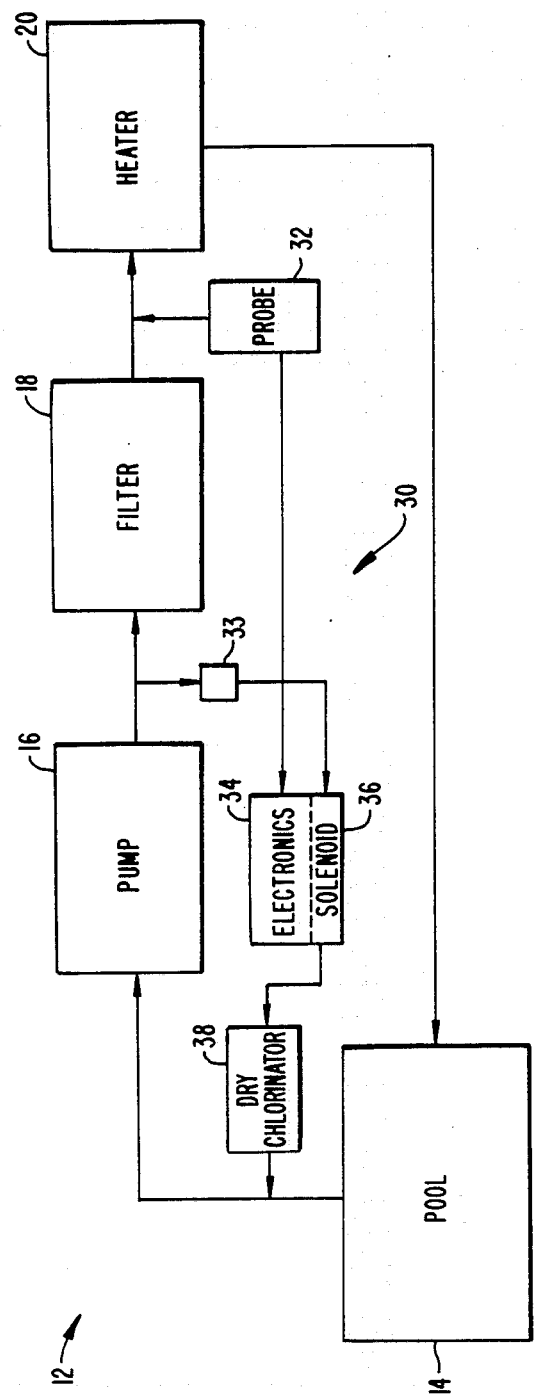
FIG.—1.

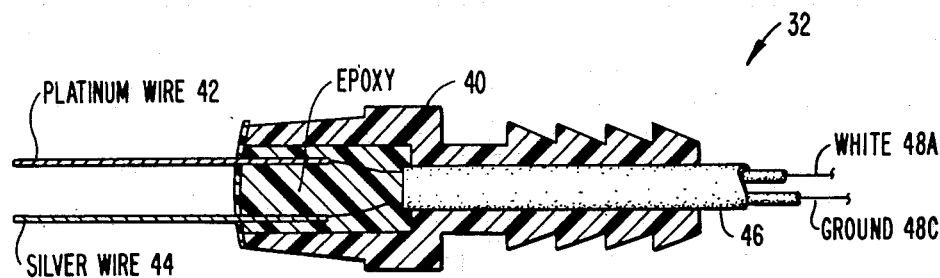
FIG._2A.
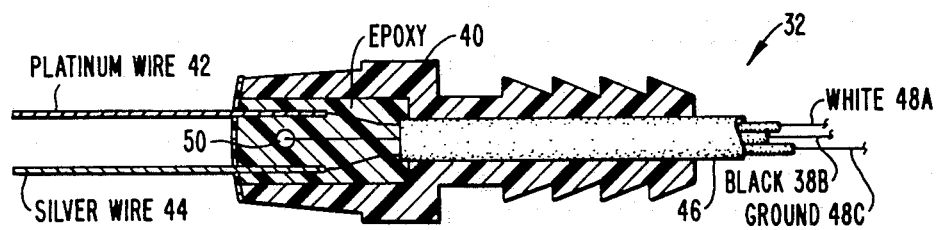
FIG._2B.
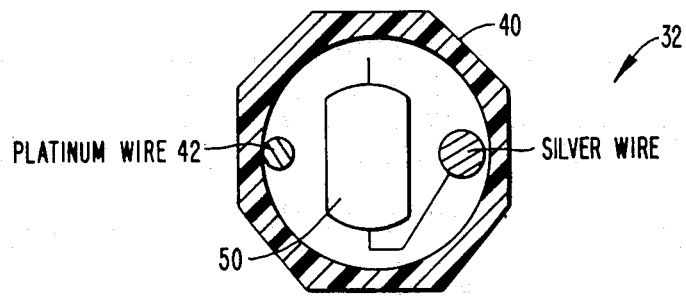
FIG._2C.

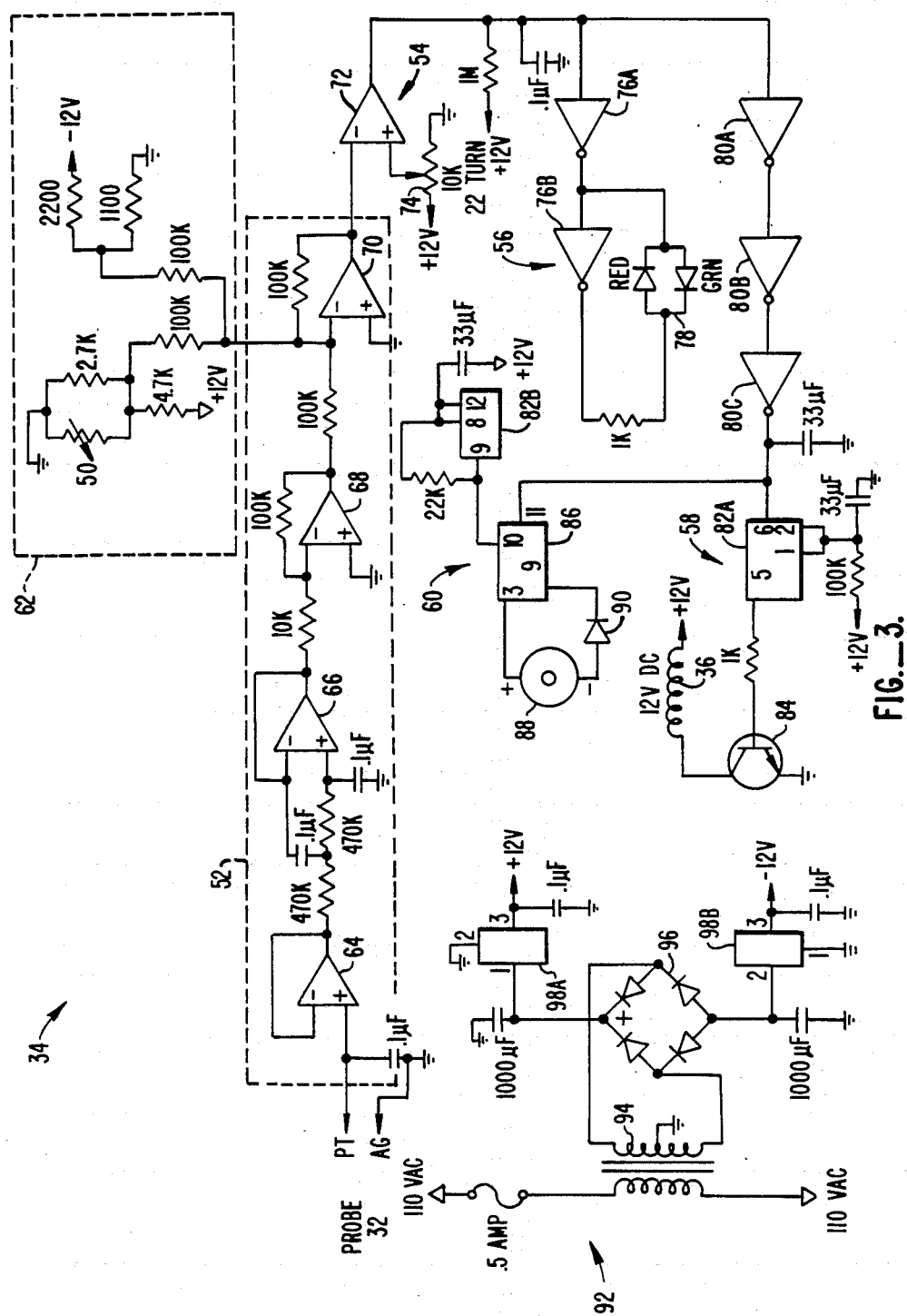
FIG._3.

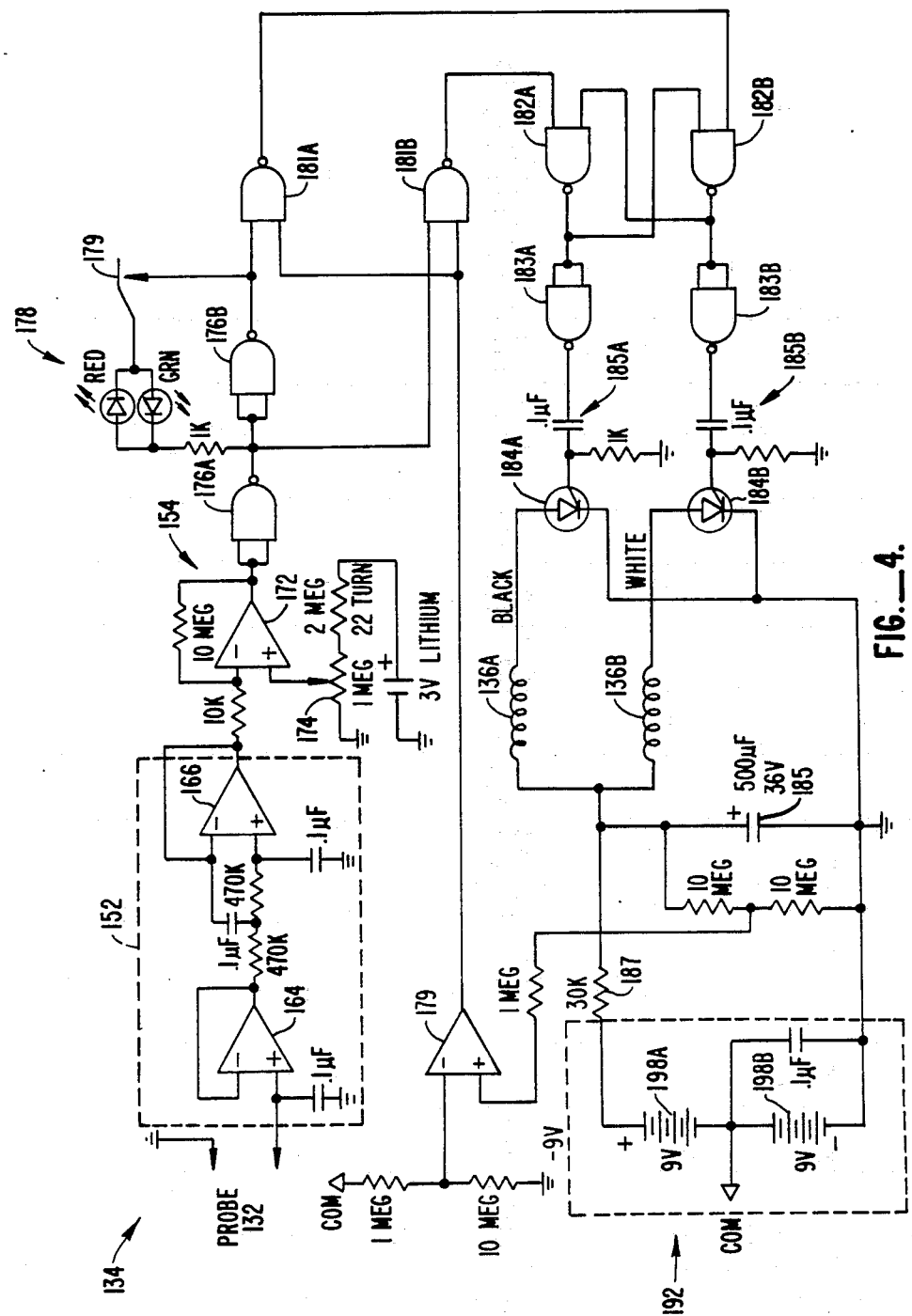
FIG._4.

AUTOMATIC DEMAND CHLORINATION SYSTEM

DESCRIPTION

1. Technical Field

This invention relates to chemical control systems, and more particularly, to an automatic demand chlorination system.

2. Background Art

Chemical control systems for controlling the chemical balance of a body of liquid such as a swimming pool are common in the art. Examples of such systems include Steininger, U.S. Pat. No. 4,224,154; Wall, U.S. Pat. No. 4,033,871; Severin, U.S. Pat. No. 4,016,079; and Maroney, U.S. Pat. No. 3,554,212.

The ideal automatic demand chlorination system should provide a simple and accurate measuring probe and comparably simple and accurate electronic controlling means. The probe should be of a type that is capable of sensing the chemicals which are commonly used as disinfectants and bactericides in swimming pools, spas, Jacuzzis, etc. One of such chemicals, e.g., chlorine, is generally used in a quantity of 0.5 to 3.0 parts per million (ppm). In addition, the probe should be simple to use and rugged in construction. For example, eliminating a reference electrode that is common in prior art probes and providing instead a single, solid state probe with its own built-in reference. Moreover, such a solid state probe also eliminates the danger of glass breakage which occur frequently in prior art glass probes. Further, a solid state probe enhances the shelf life of the probe since it does not require the use of an electrolyte solution which in turn is also susceptible to bacterial growth. As for the electronics, it should also be simple in design and easy to use.

DISCLOSURE OF THE INVENTION

In light of the prior art, it is a major object of the present invention to provide an automatic demand chlorination system that is simple in design and easy to use.

It is another object of the present invention to provide an automatic demand chlorination system that utilizes a probe that is not only easy to use but also physically rugged.

It is a further object of the present invention to provide an automatic demand chlorination system that employs an electronics unit that is simple in design and easy to use.

In order to accomplish the above and still further objects, the present invention provides an automatic demand chlorination system for use with a recirculation unit for a body of fluid, the body of fluid has a chemical therein. The automatic demand chlorination system comprises a chemical sensing unit for detecting the amount of the chemical and producing a signal, a chemical feed unit for feeding the chemical into the recirculation unit, an electronics unit for controlling the feeding of the chemical, and a solenoid unit for actuating the chemical feed unit. The electronics unit comprises input signal regulation means for receiving the signal of the sensing unit and generating a regulated signal; comparator means for comparing the regulated signal with a pretermined signal representative of the desired amount of the chemical in the recirculation unit and generating a chemical infeed signal; and solenoid timer means for receiving the chemical infeed signal and activating the solenoid unit.

Other objects, features and advantages of the present invention will appear from the following detailed description of the best mode of a preferred embodiment, taken together with the accompanying drawings.

BRIEF DESCRIPTION OF THE DRAWINGS

FIG. 1 is a simple block diagram of a recirculation unit that employs the automatic demand chlorination system of the present invention;

FIG. 2A is an enlarged, side cross-section view of the probe of the automatic demand chlorination system of FIG. 1;

FIG. 2B is an enlarged, side cross-section view of an alternative embodiment of the probe of FIG. 2A;

FIG. 2C is an enlarged, axial cross-section view of the probe of FIG. 2B;

FIG. 3 is a schematic of the electronics unit of the automatic demand chlorination system of FIG. 1; and FIG. 4 is a schematic of an alternative embodiment of the electronics unit of FIG. 3.

BEST MODE FOR CARRYING OUT THE INVENTION

Referring to FIG. 1, there is shown a conventional swimming pool recirculation unit, generally designated 12. Water is first pumped from swimming pool 14 by a pump 16 which in turn is filtered by a filter 18 and heated by a heater 20 before returning to pool 14. In addition, recirculation unit 12 also comprises an automatic demand chlorination system of the present invention, designated 30. Chlorination system 30 comprises a probe 32, an electronics unit 34, a solenoid unit 36 and a chlorinator 38. In operation, probe 32 first senses the amount of chemical, e.g., chlorine, in pool 14. If chlorine is needed, electronics unit 34 then activate solenoid 36 which in turn physically controls the infeeding of chlorine into system 12 by chlorinator 38.

More particularly, as best shown in FIG. 2A, probe 32, an oxidation-reduction type sensor, is a generally axially extending tubular member 40 that has at one of its ends two protruding wires or electrodes, one of platinum and one of silver, designated 42 and 44, respectively. Protruding at the other end of member 40 is a conventional coaxial cable 46 that has two conventional wires 48A and 48C which are designated white and ground, respectively. In the preferred embodiment, platinum wire 42, a No. 22 gauge wire of approximately 20 millimeters in length, is connected to white wire 48A. Silver wire 44, a No. 20 gauge wire of approximately 20 millimeters in length, is connected to ground wire 48C. Moreover, those portions of platinum wire 42 and silver wire 44 which are received in member 40 are embedded in conventional epoxy. This technique enables the two wires to be as far apart as possible such that the resistance between wires 48A and 48C in air is infinite.

In an alternative embodiment of probe 32, as best shown in FIGS. 2B and 2C, probe 32 further comprises a conventional thermistor 50. In addition, coaxial cable 46 further includes a black wire 48B. Thermistor 50, having a resistance of approximately 10 kiloohms, is connected to both black wire 48B and ground wire 48C. Epoxy potting is then used to separate thermistor 50 from wires 42 and 44. Moreover, the resistance between black and white wires 48A and 48B in air should also be infinite; the resistance between black wire 48B and ground wire 48C in air should be approximately 10 kiloohms.

Thus assembled, probe 32 is capable of detecting chlorine in a body of water in the range of 0.5 to 3 parts per million (ppm), with the capability of differentiating gradations of approximately 0.2 ppm. Probe 32 utilizes the physical phenomenon of oxidation reduction in which ions propagate from a silver wire to a platinum wire. When free chlorine is introduced in the presence of silver wire 44, it reduces to both chloride radicals and electrons. The chloride then quickly oxidizes with the silver to produce silver chloride, resulting in a film of silver chloride that coats silver wire 44. The presence of the freed electrons produces a current flow within the body of liquid. This current flow is then detected.

Probe 32, therefore, embodies advantages which are absent in prior art probes. For example, whereas prior art probes generally required the use of a second reference electrode, probe 32 has its built-in reference. In addition, whereas prior probes were generally glass probes which injured users when broken, probe 32 is a solid state probe. Probe 32, having its solid state characteristics, also enhances the shelf life of the probe by extending its shelf life to infinity whereas prior art glass probes have shelf lifes of approximately one year. This extension in shelf life is due to the fact that prior art glass probes must necessarily employ electrolyte solutions which were susceptible to bacterial growth, and such bacterial growth is highly unlikely in a solid state environment. Further, due to its solid state characteristic, probe 32 is easy to clean.

As for electronics unit 34 and portions of solenoid unit 36, they are more fully illustrated in FIG. 3. Electronics unit 34 comprises input signal regulation means 52, comparator means 54, chlorine level indicator means 56, and solenoid timer means 58. In an alternative embodiment, electronics unit 34 further comprises chlorination alarm timer means 60 and temperature compensator means 62.

More particularly, input signal regulation means 52 includes buffer means 64, filter means 66, amplifier means 68, and summer means 70. In particular, buffer means 64 is a conventional high impedance operational amplifier for receiving the signals from probe 32. Buffer op amp 64 is adapted such that it outputs a 3-millivolt signal for each ppm of chlorine detected by probe 32. In turn, filter means 66 is another conventional operational amplifier for filtering out the 60-cycle noise that is generally present in the environment of probe 32. Moreover, the output of filter op amp 66 is then amplified by amplifier means 68 which is also a conventional operational amplifier. Op amp 68 is capable of amplifying the output of filter op amp 66 by ten times.

As illustrated previously, probe 32 in the alternative embodiment includes a thermistor 50 for compensating the variations of temperature in the body of fluid. For example, an enclosed body of fluid such as a spa need not require a thermistor. However, solar-heated swimming pools generally have large temperature swings which could cause large variations in the amount of chlorine injected into the pool. This variation may be as high as 5 to 6 times of the normal amount. Thus, temperature compensator means 62 is provided in which thermistor 50 is an integral component. In operation, as the temperature of the probe environment increases, the voltage of probe 32 decreases by 0.0035 volt per degree Centigrade. At the temperature of 25° C., thermistor 50 is approximately 10 kiloohms. Thus, summer means 70, a conventional operational amplifier, is used to receive both the voltage representative of probe 32 and the voltage of temperature compensator means 62.

In addition, electronics unit 34 also comprises comparator means 54. Comparator means 54 includes a conventional precision voltage comparator 72 one input of which is connected to the output of summer op amp 70. The other input of comparator op amp 72 is connected to a conventional potentiometer 74 that provides an adjustable reference voltage. The reference voltage is generally set at three volts. In operation, if the voltage of probe 32 is above the reference voltage, the output of comparator op amp 72 goes to a negative 12 volts. If, however, the voltage of probe 32 is below the reference voltage of potentiometer 74, the output of comparator op amp 72 goes to a positive 12 volts.

The output of comparator op amp 72 is inputted into at least two devices—LED indicator means 56 and solenoid timer means 58. In particular, LED indicator means 56 includes a pair of inverters 76A and 76B and a conventional bi-color light emitting diode (LED) 78 that is used to indicate the level of the chlorine in the body of fluid. In operation, inverters 76A and 76B are capable of causing the voltage between the leads of LED 78 to alternate between ground and positive 12 volts. For example, when comparator op amp 72 is at a negative 12 volts, indicating that the voltage of probe 32 is above the reference voltage of potentiometer 74, the one megaohm resistor causes the negative 12 volts to be an effective ground. The output of inverter 76A is, therefore, high such that the green LED of bicolor LED 78 is activated. The activation of the green LED indicates that the chlorine level in the body of fluid is above the desired, preset level such that additional chlorine is not needed. When the output of comparator op amp 72 is at a positive 12 volts, indicating that the voltage of probe 32 is below the reference voltage, the output of inverter 76B is high, activating the red LED of bicolor LED 78. The activation of the red LED indicates that the amount of chlorine in the body of fluid is below the preset level such that additional chlorine is needed.

A plurality of inverters 80A, 80B and 80C are provided the output of which is connected to solenoid timer means 58. More particularly, solenoid timer means 58 includes a conventional timer 82A and a conventional NPN transistor 84. One lead of transistor 84 is connected to conventional solenoid 36.

In operation, if no chlorine is called for, i.e., the output of comparator op amp 72 is low, the output of inverter 80C becomes high and resets timer 82A. If chlorine is needed, the output of inverter 80C is low which grounds input 6 of timer 82A, thereby activates timer 82A. In turn, the output of timer 82A drives transistor 84 which in turn is connected to solenoid 36. Timer 82A is configured such that solenoid 36 must be on for at least 10 seconds before it is turned off. This 10-second period is provided to prevent solenoid chatter which can occur when the probe voltage approaches the preset reference voltage. In addition, this increase in chlorine is another way of adding hysteresis to the electronics unit. However, if input 6 of timer 82A remains low, it causes solenoid 36 to remain open.

The output of comparator op amp 72 is also inputted into chlorination alarm timer means 60 which includes a conventional timer 82B, a conventional counter 86, a conventional piezo sound device 88 and a conventional diode 90. In particular, timer 82B is capable of producing an approximately one second square wave output which is forwarded to counter 86. The square wave output at pin 9 is regulated by the 33-microfard capacitor and the 22-kiloohm resistor connected to pins 12 and 8, respectively, of timer 82B. When chlorine is called for, counter 86 is activated when its pin 11 is reset by the low signal of inverter 80C. Counter 86 then proceeds to count 16,384 counts, approximately 4 hours and 33 minutes, before its pin 3 is activated. The high signal at pin 3 activates piezo sound device 88. The activation of piezo device 88 indicates that the chlorine in chlorinator 38 has been used up. The negative input of piezo device 88 goes to diode 90 which in turn is connected to counter 86. As for counter 86, its pin 9 alternates between ground and positive 12 volts approximately every two seconds. When pin 9 becomes negative every one second, it causes piezo device 88 to beep. After another 16,384 counts, pin 3 of counter 86 becomes negative, turning off piezo device 88. Although timers 82A and 82B are described as separate components, they in the preferred embodiment are actually configured as a single component.

Further, electronics unit 34 further comprises a power supply unit 92 that comprises of either a 110 volt or 220 volt alternating current source, a conventional center-tapped transformer 94, a conventional rectifier bridge 96, and two conventional voltage regulators 98A and 98B. The outputs of voltage regulators 98A and 98B, positive 12 volts DC and negative 12 volts DC, respectively, provide the power supply for automatic demand chlorination system 30.

In operation, probe 32 is placed into the recirculation water line between filter 18 and heater 20. Although probe 32 is illustrated as positioned between filter 18 and heater 20, it could be positioned at any location of recirculation unit 12 except for within 12 inches downstream of chlorinator 38. Except for that close vicinity to chlorinator 38, any other location would permit probe 32 to measure the amount of chemical, e.g., chlorine, that has been fully diluted into the water. The chlorine in recirculation unit 12, reflective of the amount of chlorine in pool 14, causes oxidation and reduction, as described previously. The concomitant detectable phenomenon of such oxidation and reduction is the current flow of free electrons which is a quantative indication of the amount of chlorine that is present in recirculation unit 12. The amount of current flow is proportional to the amount of chlorine.

This current flow is first detected and forwarded to input signal regulation means 52. If thermistor 50 is provided, then system 30 would include temperature compensator means 26. The detected signal from probe 32, representing the actual amount of chlorine in recirculation unit 12, is then compared with the reference voltage from potentiometer 74 which represents the amount of chlorine desired by a user. If chlorine is need, as indicated by a positive 12 volt output of comparator op amp 72, the red LED of bicolor LED 78 is activated. In addition, timer 82A is enabled so as to activate solenoid 36 and counter 86 is enabled so as to activate piezo 88 if the infeeding of the chlorine exceeds 4 hours and 33 minutes. Solenoid 36, as best shown in FIG. 1, has its input connected to the water line between pump 16 and filter 18. The input of solenoid 36 may be connected to any location of the water line so long as that water line contains positive pressure for forcing the water into solenoid 36. A conventional filter 33 is positioned between pump 16 and solenoid 36 so as to filter out debris that may be present in recirculation system 12. The output of solenoid 36 is fed into dry chlorinator 38 which in turn feeds the chlorine into the water line between pool 14 and pump 36. Conversely, if chlorine is not needed, the negative 12 volt output of comparator op amp 72 is only capable of activating the green LED of bicolor LED 78. Both timer 82A and counter 86 are inactivated in this instance.

As best illustrated in FIG. 4, there is shown an alternative embodiment of automatic demand chlorination system 30. In essence, alternative embodiment only differs from system 30 in relation to the electronics aspect. Since many elements in alternative electronics unit 134 are similar to elements of electronics unit 34 of the preferred embodiment, a numeral "1" added to the numerals which designated corresponding elements of the preferred embodiment. For example, the input signal regulation means in the alternative embodiment is designated 152 whereas the corresponding unit in the preferred embodiment is designated 52. In addition, those alternative elements which function in a manner identical to their counterparts of the preferred embodiment will not be described in detail unless necessary. A minor variation of system 130 is that it employs a conventional backflow preventer, not shown, that is positioned at the water line between solenoid 136 and chlorinator 138.

The foremost difference between the alternative embodiment and the preferred embodiment is the type of energy source. The power supply unit 192 of electronics unit 134 employs a pair of conventional alkaline 9-volt batteries 198A and 198B. Batteries 198A and 198B may be used for at least one year and possibly two years.

More particularly, input signal regulation means 152 includes buffer means 164 and filter means 166. The output of filter op amp 166 is forwarded to comparator means 154 which includes comparator operational amplifier 172 and conventional 22-turn, one-megaohm potentiometer 174. The reference voltage is set at approximately 300 millivolts. The voltage for potentiometer 174 is provided by a conventional 3-volt Lithium battery. In operation, if the voltage representative of probe 132 is above the reference voltage indicated on potentiometer 174, the output of comparator op amp 172 goes to ground. Conversely, if the voltage of probe 132 is below the reference voltage, then comparator op amp 172 outputs a positive 9 volts.

The output of comparator op amp 172 is forwarded to a pair of cascading NAND gates 176A and 176B which are configured as inverters. The outputs of inverters 176A and 176B drive bi-color LED 178 if switch 179 is activated. Switch 179 is added to the system so that bi-color LED 178 would not be activated unless needed by the user. Inverters 176A and 176B, in conjunction with NAND gates 181A and 181B, form a conventional Schmitt trigger which is used to insure snap type action for the rest of the circuitry. The functions of NAND gates 181A and 181B are described below. The outputs of NAND gates 181A and 181B are in turn inputted to flip-flops 182A and 182B. Each of the outputs of flip-flops 182A and 182B is forwarded to inverters 183A and 183B, respectively. The outputs of inverters 183A and 183B, via resistive-capacitive (RC) networks 185A and 185B, respectively, then activates silicon-controlled rectifiers (SCR's) 184A and 184B, respectively. SCR's 184A and 184B are connected to a pair of solenoid coils 136A and 136B.

Solenoid coils 136A and 136B are controlled by a 500-microfarad capacitor 185, which is charged to 18 volts by batteries 198A and 198B via a 30-kiloohm resistor 187. The energy contained in capacitor 185 is then dumped into solenoid coils 136A and 136B so as to open or close the solenoid. To ensure that capacitor 185 is at its maximum before dumping, a charge detection unit is provided. It is important that capacitor 185 reaches its maximum before discharging or else system 130 might believe it had shut off the solenoid when, in actuality, it lacked sufficient energy to close the solenoid, permitting unwanted and uncontrolled addition of chlorine. The charge detection unit includes a conventional operational amplifier 179 that functions as a voltage comparator. One input of op amp 179 is the voltage of one of the two batteries 198A and 198B minus 10%. The other input of op amp 179 is one half of the voltage of capacitor 185. In operation, when the voltage across capacitor 185 exceeds 9 volts minus 10%, the output of op amp 179 goes positive. This positive output is then inputted to NAND gates 181A and 181B. NAND gates 181A and 181B, thus, will not pass a signal from probe 132 unless capacitor 185 has been fully charged.

As for flip-flops 182A and 182B, they will not change their state unless both the voltage of probe 132 has crossed the reference of potentiometer 174 and capacitor 185 has been fully charged. Each of the outputs of flip-flops 182A and 182B, via inverters 183A and 183B, causes its respective SCR 184A or 184B to pulse capacitor 185. Capacitor 185, in turn, discharges to a respective one of either solenoid coil 136A or 136B.

It will be apparent to those skilled in the art that various modifications may be made within the spirit of the invention and the scope of the appended claims. For example, although chlorine is the preferred chemical added to pool 14, other chemicals such as bromine may be used. In the case of bromine, its preferred level in the body of water is approximately 2–6 ppm. In addition, the locations of probe 32, solenoid 36 and chlorinator 38 in relation to the various water lines of recirculation unit 12 may be varied.

I claim:

1. For use with a recirculation unit for a body of fluid, said body of fluid having a chemical therein, an automatic demand chlorination system, comprising
    a chemical sensing unit for detecting the amount of said chemical and producing a signal, wherein said chemical sensing unit is a liquidless, solid state device;
    a chemical feed unit for feeding said chemical into said recirculation unit;
    an electronics unit for controlling said feeding of said chemical; and
    a solenoid unit for actuating said chemical feed unit, said electronics unit comprises
        input signal regulation means for receiving said signal of said chemical sensing unit and generating a regulated signal, wherein said input signal regulation means includes
            buffer means for receiving said chemical sensing unit signal and generating a signal representative of said chemical sensing unit signal,
            filter means for receiving said buffer means signal and generating a filtered signal, and
            amplifier means for receiving said filtered signal and generating said regulated signal;
        comparator means for comparing said regulated signal with a predetermined signal representative of the desired amount of said chemical in said recirculation unit and generating a chemical infeed signal; and
        solenoid timer means for receiving said chemical infeed signal and activating said solenoid unit.

2. The automatic demand chlorination system as claimed in claim 1, wherein said chemical sensing unit is an oxidation reduction unit.

3. The automatic demand chlorination system as claimed in claim 2, wherein said oxidation reduction unit comprises two sensors one of which being platinum and another being silver.

4. The automatic demand chlorination system as claimed in claim 1, 2 or 3, wherein said body of fluid having variations in temperature, wherein said chemical sensing unit further comprises temperature compensation device for compensating said temperature variations of said body of fluid.

5. The automatic demand chlorination system as claimed in claim 4, wherein said electronics unit further comprises temperature compensation means for compensating said temperature variations detected by said temperature compensation device.

6. The automatic demand chlorination system as claimed in claim 5, wherein said electronics unit further comprises chemical absence alarm timer means for receiving said chemical infeed signal and generating an alarm signal if said feeding exceeds a predetermined period.

7. For use with a recirculation unit for a body of fluid, said body of fluid having a chemical therein, an automatic demand chlorination system, comprising
    a chemical sensing unit for detecting the amount of said chemical and producing a signal, wherein said chemical sensing unit is a liquidless, solid state, oxidation reduction unit;
    a chemical feed unit for feeding said chemical into said recirculation unit;
    an electronics unit for controlling said feeding of said chemical; and
    a solenoid unit for actuating said chemical feed unit, said electronics unit comprises
        input signal regulation means for receiving said signal of said chemical sensing unit and generating a regulated signal, wherein said input signal regulation means includes
            buffer means for receiving said chemical sensing unit signal and generating a signal representative of said chemical sensing unit signal,
            filter means for receiving said buffer means signal and generating a filtered signal, and
            amplifier means for receiving said filtered signal and generating said regulated signal;
        comparator means for comparing said regulated signal with a predetermined signal representative of the desired amount of said cherical in said recirculation unit and generating a chemical infeed signal; and
        solenoid timer means for receiving said chemical infeed signal and activating said solenoid unit.

8. The automatic demand chlorination system as claimed in claim 7, wherein said electronics unit further comprises chemical feeding indicator means for indicating both said feeding of said chemical and the nonfeeding of said chemical.

9. The automatic demand chlorination system as claimed in claim 8, wherein said chemical feeding indicator means is a visual indicator.

10. The automatic demand chlorination system as claimed in claim 7, wherein said solenoid timer means comprises
    timer means for controlling the duration of said activation of said solenoid unit, and
    activation means for actuating said solenoid unit.

11. The automatic demand chlorination system as claimed in claim 7, further comprises chemical absence alarm timer means for receiving said chemical infeed signal and generating an alarm signal if said feeding exceeds a predetermined period.

12. The automatic demand chlorination system as claimed in claim 11, wherein said chemical absence alarm timer means comprises
    counter means for counting the duration of said feeding of said chemical, and generating said alarm signal.

13. The automatic demand chlorination system as claimed in claim 12, wherein said chemical absence alarm timer means further comprises audio indicator means for receiving said alarm signal and audially indicating said feeding of said chemical.

14. The automatic demand chlorination system as claimed in claim 7, 8, 9, 10, 11, 12 or 13, wherein said body of fluid having variations in temperature, wherein said chemical sensing unit further comprises temperature compensation device for compensating said temperature variations of said body of fluid.

15. The automatic demand chlorination system as claimed in claim 14, wherein said electronics unit further comprises temperature compensation means for compensating said temperature variations detected by said temperature compensation device.

16. For use with a recirculation unit for a body of fluid, said body of fluid having a chemical therein, an automatic demand chlorination system, comprising
    a chemical sensing unit for detecting the amount of said chemical and producing a signal, wherein said chemical sensing unit is a liquidless, solid state, oxidation reduction unit having two sensors one of which being platinum and another being silver;
    a chemical feed unit for feeding said chemical into said recirculation unit;
    an electronics unit for controlling said feeding of said chenical; and
    a solenoid unit for actuating said chemical feed unit, said electronics unit comprises
        input signal regulation means for receiving said signal of said chemical sensing unit and generating a regulated signal, wherein said input siganl regulation means includes
            buffer means for receiving said chemical sensing unit signal and generating a signal representative of said chemical sensing unit signal,
            filter means for receiving said buffer means signal and generating a filtered signal, and
            amplifier means for receiving said filtered signal and generating said regulated signal;
        comparator means for comparing said regulated signal with a predetermined signal representative of the desired amount of said chemical in said recirculation unit and generating a chemical infeed signal;
        chemical feeding indicator means for indicating both said feeding of said chemical and the nonfeeding of said chemical, wherein said indicator means is a visual indicator; and
        solenoid timer means for receiving said chemical infeed signal and activating said solenoid unit, wherein said solenoid timer means comprises
            timer means for controlling the duration of said activation of said solenoid unit, and
            activation means for actuating said solenoid unit.

17. The automatic demand chlorination system as claimed in claim 16, wherein said body of fluid having variations in temperature, wherein said chemical sensing unit further comprises temperature compensation device for compensating said temperature variations of said body of fluid.

18. The automatic demand chlorination system as claimed in claim 17, wherein said temperature compensation device is a thermistor.

19. The automatic demand chlorination system as claimed in claim 17 or 18, wherein said electronics unit further comprises temperature compensation means for compensating said temperature variations detected by said temperature compensation device, said temperature compensation means is connected to said input signal regulation means.

20. The automatic demand chlorination system as claimed in claim 19, wherein said electronics unit further comprises chemical absence alarm timer means for receiving said chemical infeed signal and generating an alarm signal if said feeding exceeds a predetermined period, said chemical absence timer means comprises
    counter means for counting the duration of said feeding of said chemical, and generating said alarm signal; and
    audio indicator means for receiving said alarm signal and audially indicating said feeding of said chemical.

21. The automatic demand chlorination system as claimed in claim 20, wherein said chemical feeding indicator means is a bicolor light emitting diode device.

22. The automatic demand chlorination system as claimed in claim 21, wherein said chemical is chlorine.

23. For use with a recirculation unit for a body of fluid, said body of fluid having a chemical therein, an automatic demand chlorination system, comprising
    a chemical sensing unit for detecting the amount of said chemical and producing a signal, wherein said chemical sensing unit is a liquidless, solid state device;
    a chemical feed unit for feeding said chemical into said recirculation unit;
    an electronics unit for controlling said feeding of said chemical, said electronics unit utilizes a portable, direct-current energy source; and
    a solenoid unit for actuating said chemical feed unit, said electronics unit comprises
        input signal regulation means for receiving said signal of said chemical sensing unit and generating a regulated signal, wherein said input signal regulation means includes
            buffer means for receiving said chemical sensing unit signal and generating a signal representative of said chemical sensing unit signal,
            filter means for receiving said buffer means signal and generating a filtered signal, and
            amplifier means for receiving said filtered signal and generating said regulated signal;
        comparator means for comparing said regulated signal with a predetermined signal representative of the desired amount of said chemical in said recirculation unit and generating a chemical infeed signal;

energy charging detection means for detecting the substantially fully-charged state of said energy source and generating a full charge signal; and discharge control means for detecting the presence of both said full charge signal and said chemical infeed signal so as to activate said solenoid unit.

24. The automatic demand chlorination system as claimed in claim 23, wherein said chemical sensing unit is an oxidation reduction unit.

25. The automatic demand chlorination system as claimed in claim 24, wherein said oxidation reduction unit comprises two chemical sensors, one of which being platinum and another being silver.

26. For use with a recirculation unit for a body of fluid, said body of fluid having a chemical therein, an automatic demand chlorination system, comprising a chemical sensing unit for detecting the amount of said chemical and producing a signal, wherein said chemical sensing unit is a liquidless, solid state, oxidation reduction unit;

a chemical feed unit for feeding said chemical into said recirculation unit;

an electronics unit for controlling said feeding of said chemical, said electronics unit utilizes a portable, direct-current energy source; and a solenoid unit for actuating said chemical feed unit, said electronics unit comprises input signal regulation means for receiving said signal of said chemical sensing unit and generating a regulated signal, wherein said input signal regulation means includes buffer means for receiving said chemical sensing unit signal and generating a signal representative of said chemical sensing unit signal, filter means for receiving said buffer means signal and generating a filtered signal, and amplifier means for receiving said filtered signal and generating said regulated signal;

comparator means for comparing said regulated signal with a predetermined signal representative of the desired amount of said chemical in said recirculation unit and generating a chemical infeed signal;

energy charging detection means for detecting the substantially fully-charged state of said energy source and generating a full charge signal; and discharge control means for detecting the presence of both said full charge signal and said chemical infeed signal so as to activate said solenoid unit.

27. The automatic demand chlorination system as claimed in claim 26, wherein said direct-current energy source comprises solenoid energy storage means for receiving energy from said energy source and storing said energy for activating said solenoid unit.

28. The automatic demand chlorination system as claimed in claim 27, wherein said energy charging detection means comprises energy source sensing means for detecting the voltage of said energy source and generating a first signal;

solenoid energy storage sensing means for detecting the voltage of said solenoid energy storage means and generating a second signal; and energy comparator means for receiving and comparing said first and second signals and generating said full charge signal.

29. The automatic demand chlorination system as claimed in claim 28, wherein said discharge control means comprises flip flop means for receiving said full charge signal and said chemical infeed signal and generating a solenoid discharge signal to activate said solenoid unit.

30. For use with a recirculation unit for a body of fluid, said body of fluid having a chemical therein, an automatic demand chlorination system, comprising a chemical sensing unit for detecting the amount of said chemical and producing a signal, wherein said chemical sensing unit is a liquidless, solid state, oxidation reduction unit having two sensors one of which being platinum and another being silver;

a chemical feed unit for feeding said chemical into said recirculation unit;

an electronics unit for controlling said feeding of said chemical, said electronics unit utilizes a portable, direct-current energy source that comprises solenoid energy storage means for receiving energy from said energy source and storing said energy for activating said solenoid unit; and a solenoid unit for actuating said chemical feed unit, said electronics unit comprises input signal regulation means for receiving said signal of said chemical sensing unit and generating a regulated signal, wherein said input signal regulation means includes buffer means for receiving said chemical sensing unit signal and generating a signal representative of said chemical sensing unit signal, filter means for receiving said buffer means signal and generating a filtered signal, and amplifier means for receiving said filtered signal and generating said regulated signal;

comparator means for comparing said regulated signal with a predetermined signal representative of the desired amount of said chemical in said recirculation unit and generating a chemical infeed signal;

energy charging detection means for detecting the substantially fully-charged state of said energy source and generating a full charge signal, wherein said energy charging detection means comprises energy source sensing means for detecting the voltage of said energy source and generating a first signal;

solenoid energy storage sensing means for detecting the voltage of said solenoid energy storage means and generating a second signal; and energy comparator means for receiving and comparing said first and second signals and generating said full charge signal; and discharge control means for detecting the presence of both said full charge signal and said chemical infeed signal so as to activate said solenoid unit, wherein said discharge control means comprises flip flop means for receiving said full charge signal and said chemical infeed signal and generating a solenoid discharge signal to activate said solenoid unit.

31. The automatic demand chlorination system as claimed in claim 30, wherein said chemical is chlorine.

* * * * *